W. R. McKinley
Marking Ground for Planting.
N° 75288          Patented Mar. 10, 1868.
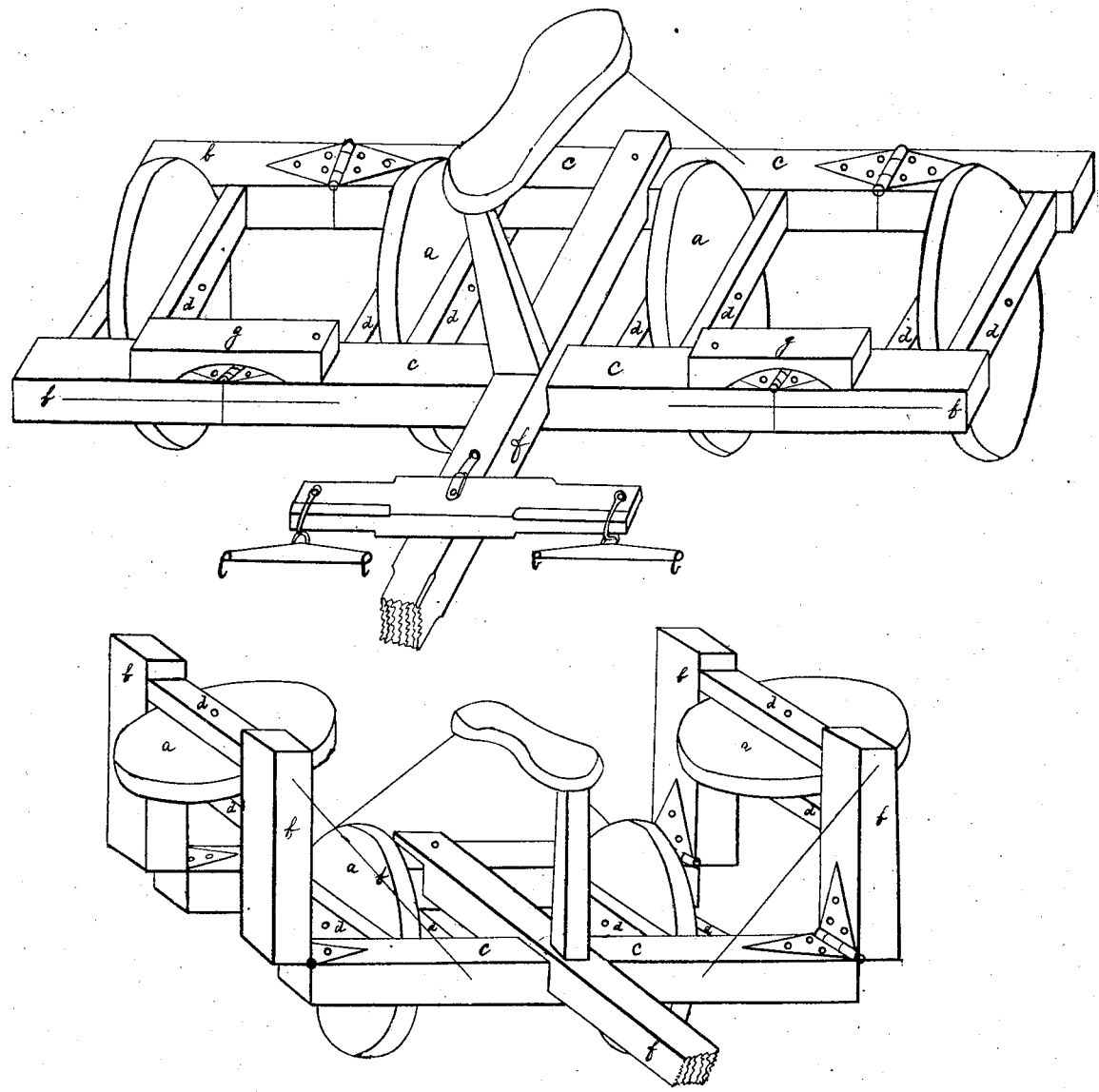
Witnesses.
T. O. McKinley
David Bum
Inventor.
William R. McKinley

United States Patent Office.

WILLIAM R. McKINLEY, OF LUCAS COUNTY, IOWA.

Letters Patent No. 75,288, dated March 10, 1868.

MACHINE FOR MARKING GROUND FOR PLANTING.

*The Schedule referred to in these Letters Patent and making part of the same.*

TO ALL WHOM IT MAY CONCERN:

Be it known that I, WILLIAM R. McKINLEY, of Lucas county, and State of Iowa, have invented a new and useful machine, to wit, a "Corn-Ground Marker;" and I do hereby declare that the following is a clear and exact description of the construction and operation of the same, reference being had to the annexed drawing and specification.

$a\,a\,a\,a$ represent the four wheels. $b\,b\,b\,b$ represent the out ends of the frame, which are turned up in passing through gates or narrow passages. $c\,c\,c\,c$ represent the stationary part of the frame. $d\,d\,d\,d\,d\,d\,d$ represent cross-pieces of timber, between which the wheels run. $e\,e$ represent the rods which support the outer ends while travelling. F, tongue. $g$ represents fastening which holds down the outer wheels when at work.

What I claim as my invention, and desire to secure by Letters Patent, is—

The frame $c\,c$, wheels $a\,a\,a\,a$, rods $f\,f\,f\,f$, in all combined, constructed, and arranged as shown and described.

WILLIAM R. McKINLEY.

Witnesses:
SAMUEL M. McKINLEY,
DAVID BEEM.